(12) United States Patent
Lutz et al.

(10) Patent No.: US 6,860,409 B2
(45) Date of Patent: Mar. 1, 2005

(54) DISPENSER FOR A LIQUID, IN PARTICULAR A BOTTLE-TOP DISPENSER

(75) Inventors: Walter Lutz, Wertheim (DE); Bernd Udo Bopp, Alzenau (DE); Peter Krank, Wertheim (DE)

(73) Assignee: Brand GmbH + CO KG, Wertheim (DE)

(*) Notice: Subject to any disclaimer, the term of this patent is extended or adjusted under 35 U.S.C. 154(b) by 29 days.

(21) Appl. No.: 10/288,772

(22) Filed: Nov. 7, 2002

(65) Prior Publication Data

US 2004/0035890 A1 Feb. 26, 2004

(30) Foreign Application Priority Data

Aug. 23, 2002 (DE) ........................................ 102 39 554

(51) Int. Cl.⁷ ................................................ B67D 5/38
(52) U.S. Cl. ...................... 222/158; 222/205; 222/402; 222/450
(58) Field of Search ................................ 222/158, 205, 222/383.1, 386, 402, 440, 450

(56) References Cited

U.S. PATENT DOCUMENTS

| | | | | |
|---|---|---|---|---|
| 3,189,233 A | * | 6/1965 | Wilson et al. | 222/440 |
| RE28,970 E | * | 9/1976 | Shapiro | 222/50 |
| 4,739,904 A | * | 4/1988 | Spencer et al. | 222/109 |
| 5,624,059 A | * | 4/1997 | Lo | 222/309 |
| 6,015,067 A | | 1/2000 | Lang et al. | |
| 6,019,256 A | * | 2/2000 | Seltzer | 222/385 |
| 6,045,010 A | * | 4/2000 | Patterson | 222/394 |
| 6,135,325 A | * | 10/2000 | Fessel et al. | 222/309 |

OTHER PUBLICATIONS

Barnstead International, "Complete REPIPET® JR, Calibratable Fixed Volume Dispenser", Instructions and Parts List, pp. 1–16.
DE 197 02 773 A1; Brand "seripettot" brochure, 9943 61, 21/0898, Brand GMBH+CO Fabrik fur Laborgerate, 4 pages.
Pro Liquid "MiniDispenser Liquid Dispensing System" Short form description, Copyright© 2000 by Pro–Liquid GmbH, pp. 1–8.

* cited by examiner

Primary Examiner—Joseph A. Kaufman
(74) Attorney, Agent, or Firm—Nixon Peabody LLP; David S. Safran

(57) ABSTRACT

A dispenser for a liquid, in particular, a bottle-top dispenser, with a cylinder/piston arrangement with a measuring cylinder (1) and a piston (2) which is capable of being displaced therein in a sealed manner, with a valve arrangement (3) connected to the piston (2), with an inlet valve and an outlet valve (5), each provided with a valve body (6) and a valve seat (7). The dispenser is characterized in that all of the parts or regions of the dispenser touched by the liquid are made entirely of a pure thermoplastic material or are coated with a pure thermoplastic material in such a manner that no contact is made by the liquid with the substrate coated with plastic material or with components of the substrate.

29 Claims, 3 Drawing Sheets

DISPENSER FOR A LIQUID, IN PARTICULAR A BOTTLE-TOP DISPENSER

BACKGROUND OF THE INVENTION

1. Field of the Invention

The invention relates to a dispenser for a liquid, in particular to a bottle-top dispenser, with a cylinder/piston arrangement having a measuring cylinder and a piston which is adapted to be displaced therein in a sealed manner, with a valve arrangement connected to the piston, with an inlet valve and an outlet valve, each of which is provided with a valve body and a valve seat.

2. Description of Related Art

Dispensers are dispensing devices for dispensing defined volumes of a liquid. Familiar, in particular, are bottle-top dispensers and burettes. A bottle-top dispenser comes into operation, in particular, in order to issue an adjustable volume of liquid repeatedly from a bottle or flask, on the top of which the dispenser is attached.

Known bottle-top dispensers are designed for one-hand operation. In the case of dispensers with high suction power, for this purpose, a spring element which is designated as a suction spring is inserted between the cylinder/piston arrangement and the measuring cylinder thereof or an abutment connected thereto, so that the piston is raised under spring force in the measuring cylinder for the purpose of aspirating liquid out of the bottle. To eject the liquid via the outlet valve, the piston is moved in again by hand against the action of the suction spring and the suction spring is tensioned for the next suction stroke. Dispensers also exist, of course, in which no suction spring is provided, but in which operation takes place by hand only in both directions of operation. Finally, motor-driven dispensers also exist.

In addition to the cylinder/piston arrangement and the valve arrangement with inlet valve and outlet valve, a dispenser normally has various other components, in particular, a manipulation casing connected to the piston and/or a volume setting and/or a valve body comprising the valve seats of the valves and/or an outer casing of the valve arrangement and/or a suction line extending from the inlet valve into the bottle and/or an ejection line leading from the outlet valve to an outlet point. In this respect, reference may be made, for example, to a bottle-top dispenser of the assignee of the present application (published German Patent Application DE 197 02 773 A1 and corresponding U.S. Pat. No. 6,015,067; BRAND "seripettor" brochure, 9943 61, 21/0898, issued by BRAND GMBH+CO Fabrik f ür Laborgeräte).

Dispensers of such a type are known from various suppliers (e.g., "REPIPET" dispensers from Barnstead International, Product Data Sheet LT 388X 6/4/30/02; ProLiquid "Minidispenser", Product Data Sheet 2000, produced by ProLiquid GmbH, 88662 Überlingen, Germany).

In the parts or regions touched by the liquid, the known dispensers considered previously already are predominantly made of plastic material—specifically, for example, of polypropylene (PP), but also of polytetrafluoroethylene (PTFE) for individual components (Barnstead "REPIPET" brochure, loc. cit.). However, the components of the valves always are made of an elastomeric material, in particular, ethylene-propylene elastomers.

It has already become known to manufacture the valves provided in dispensers from plastic materials made of polytetrafluoroethylene (PTFE) or similar materials or comprising such materials. These valves have a higher resistance to chemicals than elastomer valves and are significantly cheaper than valves with a glass/ceramic pairing.

Glass and ceramics generally contain metal oxides. The same applies to elastomers. Reagents that elute metal oxides, particularly certain acids, find application in particular in trace analysis. Therefore, chemically bonded metal oxides etc. are also released and are accordingly troublesome in trace analysis. Metal oxides also occur in dyestuffs, in reinforcing materials and in fillers for plastic materials and also in processing aids.

SUMMARY OF THE INVENTION

The problem underlying the teaching is to provide a dispenser for a liquid that is also capable of being employed in a particularly expedient manner in the field of trace analysis and for a wide range of applications.

The teaching of the present invention solves the problems described above in the case of a dispenser having the features mentioned initially by virtue of the fact that all the parts or regions of the dispenser touched by the liquid are made entirely of a pure thermoplastic material or, to the extent that this is adequate for the intended application, are coated with a pure thermoplastic material in such a manner that no contact is made by the liquid with the substrate coated with plastic material or with components of the substrate.

That all the parts or regions of the dispenser touched by the liquid are made entirely of a pure thermoplastic material is meant that the described pure thermoplastic material is one that is not mixed with other plastic materials or constituents. To the extent that this is adequate for the intended application, at least all the parts or regions of the dispenser touched by the liquid are coated with such a plastic material in such a manner that no contact is made by the liquid with the substrate coated with plastic material or with components of said substrate. The expression 'no contact' means, on the one hand, no touching in the narrower sense, but also, on the other hand, the avoidance of an interfering diffusion of constituents of the substrate into the liquid through a coating of plastic material.

Particular importance is given to a configuration where the plastic material or materials is/are free of inorganic constituents. Inorganic constituents in this sense are, in particular, the metal oxides already mentioned above, which, in particular, show problems for trace analysis. A pure thermoplastic material that is free of inorganic constituents is, to this extent, the perfect material for manufacturing a dispenser that is especially suitable for the field of trace analysis.

Further importance, independently, is a teaching to the effect that at least the parts or regions of the dispenser touched by the liquid are constructed in the form of injection molded parts. From the point of view of manufacturing technology, this is a particular advantage for the resultant possibilities of constructional design and for economic manufacture. The closed surfaces of injection-moulded parts also have a beneficial effect as regards cleaning or rinsing of the dispenser. Similarly, with this manufacturing process, a high precision of molding of the parts is achieved for the cylinder/piston arrangement that crucially influence volumetric precision of the metered liquid to be dispensed.

Finally, further and independent significance is also given to the measure that the measuring cylinder exhibits a gradation to a slightly larger diameter and the piston with its seal is adjustable beyond this gradation for the purpose of autoclaving, so that the seal of the piston lies within the range of the larger diameter of the measuring cylinder. By this measure, it is ensured that autoclaving as a whole is possible also in the case of a dispenser made of plastic material. This will be explained in still further detail later, in the Detailed Description portion of this specification.

The invention will now be explained in more detail in the following on the basis of a drawing representing merely a preferred exemplary embodiment.

DETAILED DESCRIPTION OF THE INVENTION

Figure 1:
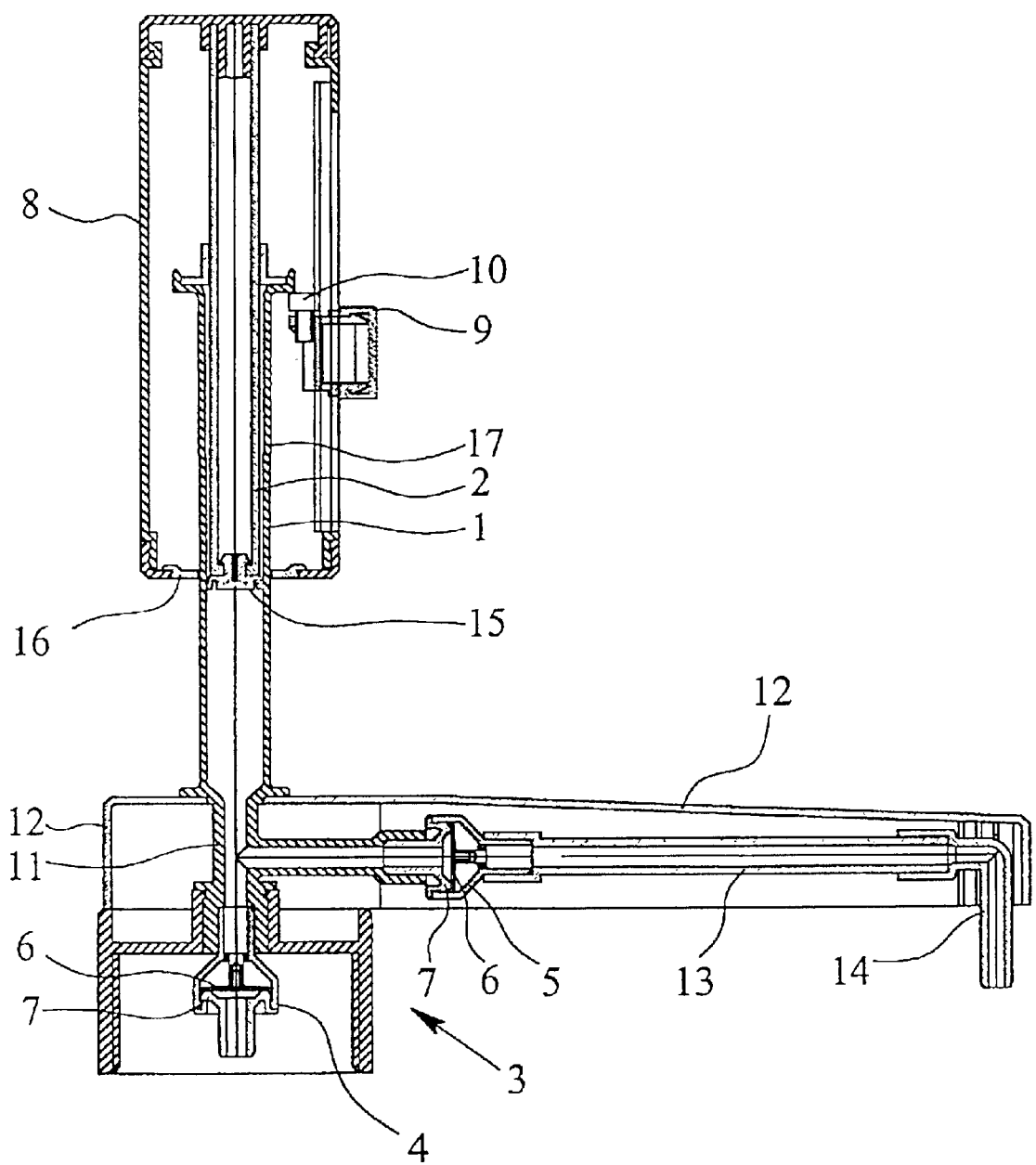
FIG. 1 is a sectional view of a dispenser according to the invention for a liquid, in the "aspirated" operating state.

Represented is a dispenser for a liquid—that is to say, a dispensing device for dispensing defined volumes of a liquid. Such dispensers are also frequently called metering devices and are known, in particular, in the form of bottle-top dispensers and burettes.

The dispenser that is represented comprises, to begin with, has a cylinder/piston arrangement with a measuring cylinder 1 and a piston 2 which is capable of being displaced therein in sealed manner. Connected to the piston 2 is a valve arrangement 3 with an inlet valve 4 and an outlet valve 5, each of which has a valve body 6 and a valve seat 7.

The components described previously are the parts of a dispenser that are necessary for the teaching of the invention. But, in other respects, it is known that a dispenser comprises or may comprise a large number of other components. The exemplary embodiment of a dispenser that is represented shows, firstly, a manipulation casing 8, which is connected to the piston 2, in the form of a sleeve made of a plastic material. Located on the manipulation casing 8, in the exemplary embodiment represented, is a volume setting 9 which is vertically adjustable. Located on the volume setting 9 is a fine adjustment 10 in the form of an adjusting screw. In the exemplary embodiment that is represented and preferred, the valve seats 7 of the inlet valve 4 and the outlet valve 5 are arranged on a valve holding body 11 of the valve arrangement 3.

Overall, the valve arrangement 3, which is attached on top of the bottle, also has an outer casing 12 in the exemplary embodiment that is represented. The outer casing 12 comprises an ejection line 13 emanating from the outlet valve 5, with a metering elbow 14. Not represented, incidentally, is the fact that a suction line, which normally projects into the bottle and is immersed in the liquid stored here, also adjoins the inlet valve 4.

In other respects, reference may be made to an extensive state of the art relating to these structural designs, in particular to a state of the art that describes a re-metering into the bottle, shows a rotary capacity of the outer casing in relation to the bottle by means of a decoupled supporting ring, etc. (published European Patent Applications EP 0 652 421 B1 & EP 0 542 241 B1; German Utility Models DE 94 22 442 U1 & DE 92 18 204 U1).

Essential for the exemplary embodiment that is represented is the fact that all the parts or regions of the dispenser touched by the liquid are made entirely of a pure thermoplastic material or are coated with a pure thermoplastic material in such a manner that no contact is made by the liquid with the substrate coated with plastic material or with components of said substrate. On this point, the essential background and advantage have already been elucidated in the general part of the specification.

In principle, the invention may provide that the pure thermoplastic material is the same for all parts or regions. But, in the exemplary embodiment that is represented and preferred, it is the case that different plastic materials adapted to the particular function are provided for the various parts or regions.

For most parts of the dispenser, use will advantageously be made of thermoplastic materials selected from the groups comprising the polyolefins and/or fluorocarbon polymers. With these materials, a universal resistance to chemicals, and consequently varied utility of the dispensers, is created. In particular, in respect of the measuring cylinder 1, it is the case that the latter is preferably manufactured from an ethylene tetrafluoroethylene with molding high precision. Similar remarks apply to the piston 2 and also to the valve holding body 11, etc. The use of a PFA plastic is particularly suitable for the valve bodies 6.

For the possibility of sterilizing the dispenser according to the invention in an optimal manner, it is advisable that the plastic material or materials is/are autoclavable. In this context, it is particularly convenient that the dispenser is autoclavable in its assembled state. The plastic materials that are used have to exhibit properties that guarantee the functional efficiency of the dispensers after autoclaving. In the specific case, a process-conditioned dimensional stability and thermal stability of shape, particularly of parts subject to mechanical stress, are demanded. Plastic materials, such as PP, PEEK, PEI, ETFE, PVDF and PFA, preferably enter into consideration in this connection. Polycarbonates, for example, are not applicable for this purpose, since stress cracks arise after a few cycles.

In another embodiment, the invention provides that the parts or regions of the dispenser not touched by the liquid also are made entirely of a pure thermoplastic material or are substantially entirely coated with a pure thermoplastic material. Abrasive wear arises on mechanically moving parts and regions of the dispenser, for example, in the region of the suction spring, and when the dispenser is attached, the abraded material can get into the liquid at least in the form of dust particles and contaminate the liquid unintentionally. With this perfected design of the dispenser, this is avoided.

In the general part of the specification, it has already been explained that inorganic constituents in the components of the dispenser, particularly in the parts or regions of the dispenser touched by the liquid, in particular metal oxides, are problematic for trace analysis.

In this context, it is therefore advisable, in accordance with a preferred teaching of the invention, that the plastic material or materials is/are free of inorganic constituents.

Up until now, it has always been explained that all of the parts or regions of the dispenser touched by the liquid are to be made entirely of a pure thermoplastic material. According to the teaching described previously, dyestuffs and other inorganic constituents are also to be omitted from the plastic materials. The selected plastic materials are distinguished by high precision of molding, by a comprehensive resistance to a large number of chemicals, by temperature stability and autoclavability. Elastomers are avoided, as are glass and ceramics.

Furthermore, it is expedient to make provision such that at least the parts or regions of the dispenser touched by the liquid are constructed in the form of injection mouldings. This results in a largely closed surface, which alleviates cleaning.

Of particular significance, and in fact also as such, is a configuration of the dispenser according to the invention which is characterized in that the measuring cylinder 1 and the valve holding body 11 are constructed integrally from pure thermoplastic material. This results in inexpensive manufacture and the avoidance of any ledges or joints between the piston 2 and the valves 4, 5.

Figure 3:
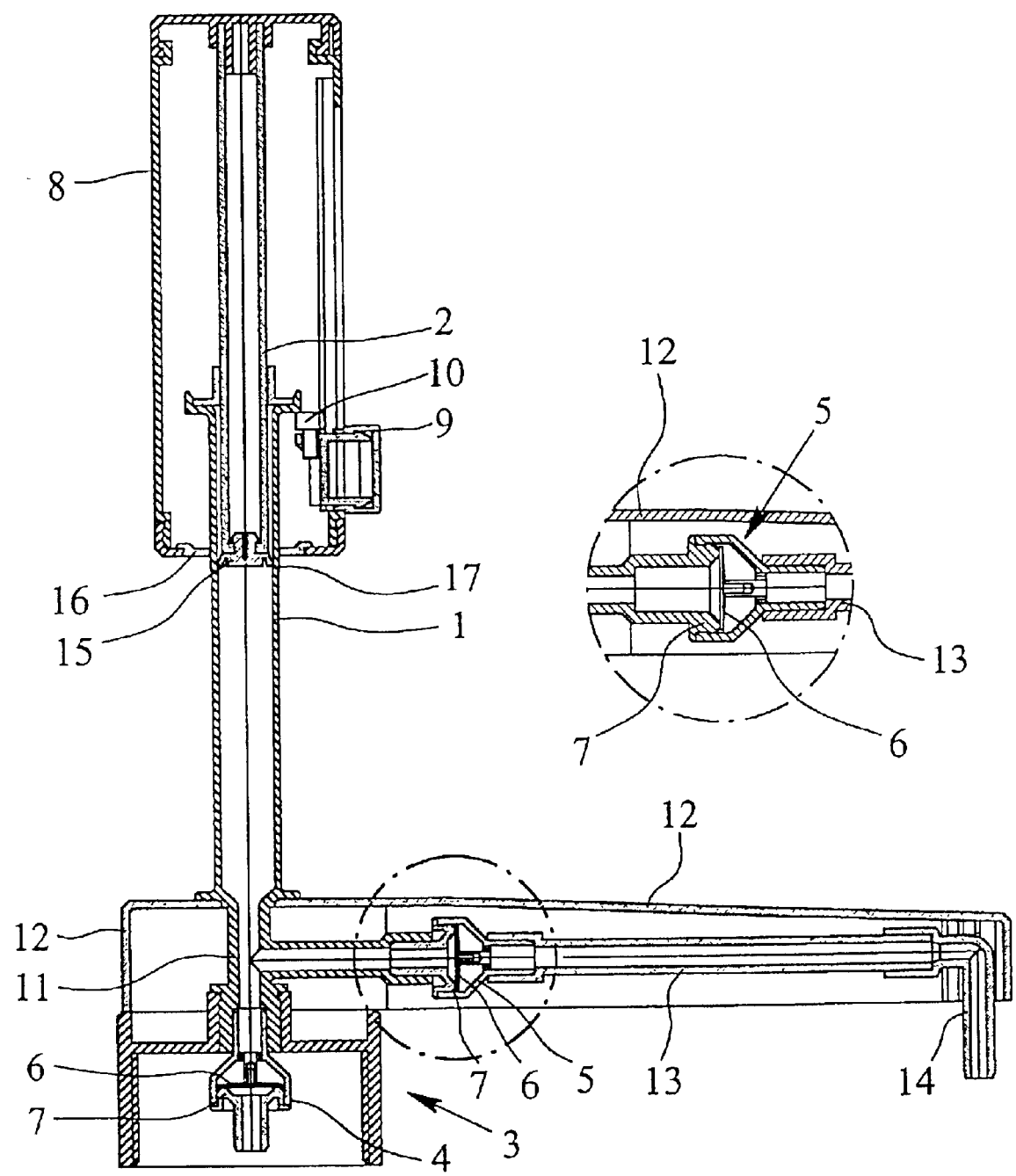
FIG. 3 shows the dispenser of FIG. 1 in the "cleaning/autoclaving" operating state.

FIG. 3 shows, in a detail, a further embodiment in which the valve seat 7 of the outlet valve 5 has been manufactured jointlessly and integrally with the valve holding body 11 in one manufacturing operation.

The exemplary embodiment represented in FIG. 1 shows, a particularly preferred embodiment in that the piston 2 is provided with a piston sealing lip on a seal 15 which is inserted into the piston 2. Moreover, it can be discerned in the figures that the manipulation casing 8 is sealed at the bottom by means of a clipped-in base 16. To this extent, accordingly, there are only plug-in connections or clip connections, thus alleviating dismantling, reassembly and cleaning.

Figure 2:
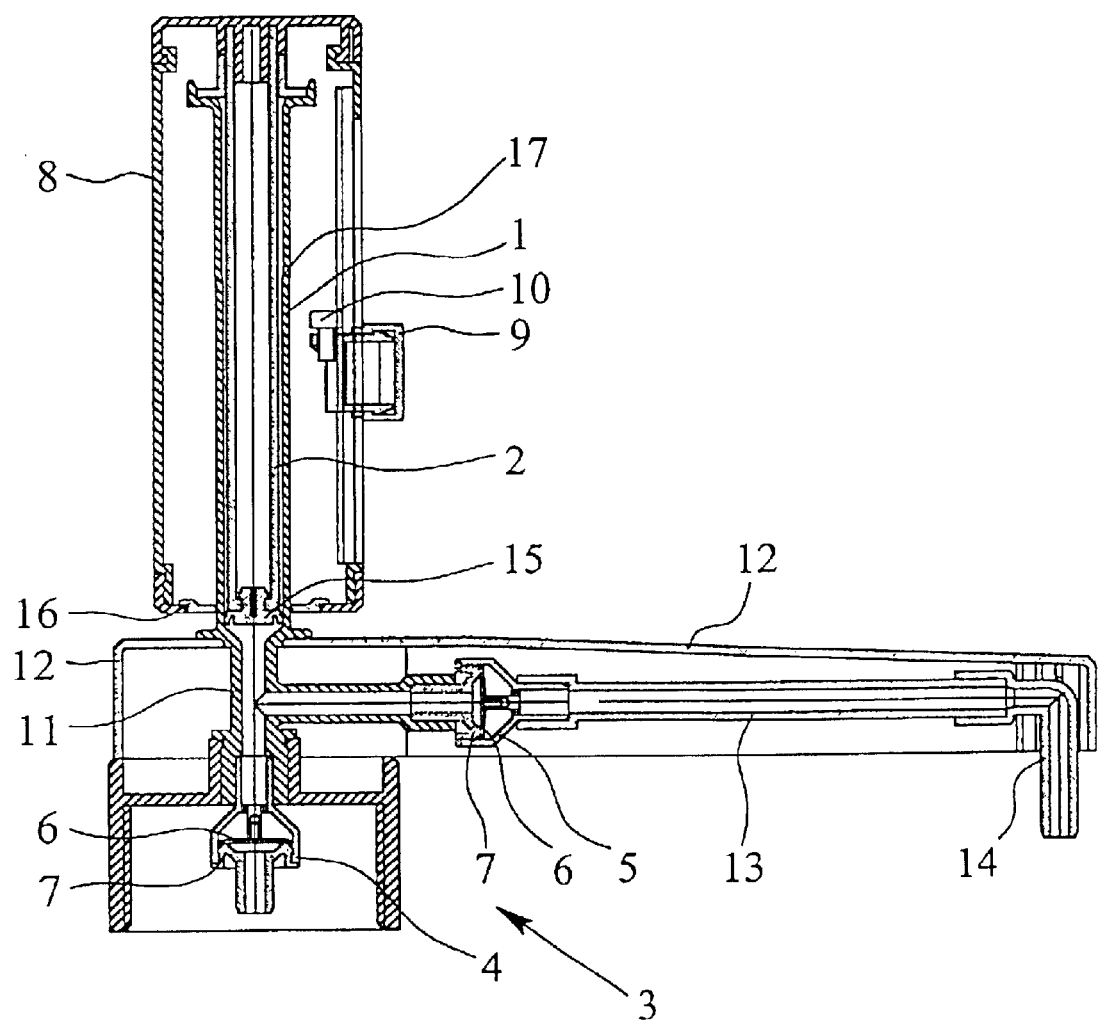
FIG. 2 shows the dispenser of FIG. 1 in the "ejected" operating state.

FIG. 1 shows the "aspirated" operating state of the dispenser; the piston 2 has been raised as far as permitted by the stop predetermined by the volume setting 9. FIG. 2 shows the "ejected" operating state; the measuring cylinder 1 has been completely discharged.

FIG. 3 shows a special position which can or should be assumed when the dispenser is being autoclaved. This position corresponds to a particularly preferred embodiment of the dispenser, which is characterized in that the measuring cylinder 1 exhibits a gradation 17 to a slightly larger diameter and the piston 2 with its seal 15 is displaceable beyond this gradation 17 for the purpose of autoclaving, so that the seal 15 of the piston 2 lies within the range of the larger diameter of the measuring cylinder 1. By this means, it is ensured that, in the course of autoclaving, the sealing action of the pre-stressed piston packing is eased or—in the case of a possibly less yielding piston 2—the elastically widened cylinder wall is relieved. In this way a plastic deformation can be prevented also in the course of autoclaving, in order subsequently to regain the full functionality of the dispenser in operation. The exemplary embodiment that is represented is distinguished furthermore by the fact that the volume setting 9 exhibits a corresponding "autoclaving" position.

What is claimed is:

1. A dispenser for a liquid, in particular a bottle-top dispenser, suitable for use in trace analysis, comprising:
   a cylinder and piston arrangement with a measuring cylinder and a piston which is adapted to being displaced in the measuring cylinder in a sealed manner, and
   a valve arrangement connected to the piston and having an inlet valve and an outlet valve, each of which provided with a valve body and a valve seat,
   wherein all the parts and regions of the dispenser which come into contact with liquid being dispensed are made entirely of at least one pure thermoplastic material or are coated with a pure thermoplastic material in such a manner that the liquid only contacts the pure thermoplastic material.

2. Dispenser according to claim 1, wherein the pure thermoplastic material is the same for all parts and regions.

3. Dispenser according to claim 2, the pure thermoplastic material is selected from the group consisting of polyolefins, fluorocarbon polymers, and an ethylene tetrafluoroethylene.

4. Dispenser according to claim 1, wherein different pure thermoplastic materials are provided for the various parts and regions.

5. Dispenser according to claim 4, wherein at least one the pure thermoplastic materials is selected from the group consisting of polyolefins, fluorocarbon polymers, and an ethylene tetrafluoroethylene.

6. Dispenser according to claim 5, wherein the valve bodies are made of a perfluoroalkoxy copolymer (PFA), wherein the pure thermoplastic materials are free of inorganic constituents and are autoclavable such that the dispenser is autoclavable in an assembled state, wherein the valve arrangement comprises a valve holding body, wherein the measuring cylinder and the valve holding body are constructed of an integral one-piece construction of pure thermoplastic materials wherein the measuring cylinder has a gradation to a slightly larger diameter and wherein the piston has a seal thereon and is adjustable beyond said gradation so that the seal of the piston lies within a range of the larger diameter of the measuring cylinder for the purpose of autoclaving.

7. Dispenser according to claim 6, wherein all parts or regions of the dispenser are made entirely of at least one pure thermoplastic material or are each substantially entirely coated therewith.

8. Dispenser according to claim 7, wherein at least the valve seat of the outlet valve is integrated within the valve holding body.

9. Dispenser according to claim 6, wherein at least the valve seat of the outlet valve is integrated within the valve holding body.

10. Dispenser according to claim 4, wherein the at least one pure thermoplastic material is free of inorganic constituents.

11. Dispenser according to claim 4, wherein the valve arrangement comprises a valve holding body, and the measuring cylinder and the valve holding body are constructed of an integral one-piece construction of pure thermoplastic material.

12. Dispenser according to claim 11, wherein at least the valve seat of the outlet valve is integrated within the valve holding body.

13. Dispenser according to claim 1, wherein the pure thermoplastic material comprises at least one material selected from the group consisting of polyolefins, fluorocarbon polymers, and an ethylene tetrafluoroethylene.

14. Dispenser according to claim 1, wherein the valve bodies are made perfluoroalkoxy copolymer (PFA).

15. Dispenser according to claim 1, wherein pure thermoplastic material is autoclavable.

16. Dispenser according to claim 15, wherein the dispenser is autoclavable in an assembled state.

17. Dispenser according to claim 15, wherein the measuring cylinder has a gradation to a slightly larger diameter, and wherein the piston, with the seal, is displaceable beyond the gradation so that the seal of the piston lies within a range of the larger diameter of the measuring cylinder for autoclaving of the dispenser.

18. Dispenser according to claim 17, wherein a volume setting is provided on the measuring cylinder and the volume setting has an "autoclaving" position.

19. Dispenser according to claim 1, wherein all parts or regions of the dispenser are made entirely of at least one pure thermoplastic material or are each substantially entirely coated therewith.

20. Dispenser according to claim 1, wherein the at least one pure thermoplastic material is free of inorganic constituents.

21. Dispenser according to claim 1, wherein the parts and regions of the dispenser touched by the liquid are formed of injection molded parts.

22. Dispenser according to claim 1, wherein the parts of the dispenser are connected to one another only via one of plug-in and clip connections.

23. Dispenser according to claim 1, wherein the valve arrangement comprises a valve holding body, and wherein the measuring cylinder and the valve holding body are constructed of an integral one-piece construction of pure thermoplastic material.

24. Dispenser according to claim 23, wherein the parts of the dispenser are connected to one another only via one of plug-in and clip connections.

25. Dispenser according to claim 23, wherein at least the valve seat of the outlet valve is integrated within the valve holding body.

26. Dispenser according to claim 1, wherein the measuring cylinder has a gradation to a slightly larger diameter, and wherein the piston, with the seal, is displaceable beyond the gradation so that the seal of the piston lies within a range of the larger diameter of the measuring cylinder for autoclaving of the dispenser.

27. Dispenser according to claim 26, wherein a volume setting is provided on the measuring cylinder and the volume setting has an "autoclaving" position.

28. A dispenser for a liquid, in particular a bottle-top dispenser, comprising:
- a cylinder and piston arrangement with a measuring cylinder and a piston having a seal thereon and which is adapted to being displaced in the measuring cylinder in a sealed manner, and
- a valve arrangement connected to the piston and having an inlet valve and an outlet valve, each of which provided with a valve body and a valve seat,
- wherein the measuring cylinder has a gradation to a slightly larger diameter, and wherein the piston, with the seal, is displaceable beyond the gradation so that the seal of the piston lies within a range of the larger diameter of the measuring cylinder for autoclaving of the dispenser.

29. Dispenser according to claim 28, wherein a volume setting is provided on the measuring cylinder and the volume setting has an "autoclaving" position.

* * * * *